US012755545B2

(12) United States Patent
Nihei et al.

(10) Patent No.: US 12,755,545 B2
(45) Date of Patent: Oct. 6, 2026

(54) MONITORING SYSTEM, MONITORING METHOD, NON-TRANSITORY COMPUTER-READABLE MEDIUM STORING PROGRAM

(71) Applicant: NEC Corporation, Tokyo (JP)

(72) Inventors: Koichi Nihei, Tokyo (JP); Yoshifumi Onishi, Tokyo (JP); Takanori Iwai, Tokyo (JP); Koichi Kawashima, Tokyo (JP); Akira Yamauchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 255 days.

(21) Appl. No.: 18/695,043

(22) PCT Filed: Oct. 11, 2021

(86) PCT No.: PCT/JP2021/037593
§ 371 (c)(1),
(2) Date: Mar. 25, 2024

(87) PCT Pub. No.: WO2023/062688
PCT Pub. Date: Apr. 20, 2023

(65) Prior Publication Data
US 2024/0420475 A1 Dec. 19, 2024

(51) Int. Cl.
*G06V 20/52* (2022.01)
*H04N 23/611* (2023.01)

(52) U.S. Cl.
CPC ........... *G06V 20/52* (2022.01); *H04N 23/611* (2023.01)

(58) Field of Classification Search
CPC ......... G06V 20/52; H04N 23/611; H04N 7/18
See application file for complete search history.

(56) References Cited

U.S. PATENT DOCUMENTS 9,948,902 B1 4/2018 Trundle
11,381,743 B1 * 7/2022 Mahbub ................ H04N 23/65
(Continued)

FOREIGN PATENT DOCUMENTS

JP 2003-274359 A 9/2003
JP 2004-320112 A 11/2004
(Continued)

OTHER PUBLICATIONS

International Search Report for PCT Application No. PCT/JP2021/037593, mailed on Dec. 21, 2021.
(Continued)

*Primary Examiner* — Tom Y Lu
(74) *Attorney, Agent, or Firm* — Sughrue Mion, PLLC

(57) ABSTRACT

A monitoring system (100) according to the present disclosure includes: a plurality of image capturing means (101) installed at a plurality of locations within a region being monitored; identifying means (102) configured to identify targets being monitored from videos captured by the plurality of image capturing means; determining means (103) configured to determine whether, of the identified targets being monitored, the same target being monitored is in the videos of the plurality of image capturing means captured in the same time span; and controlling means (104) configured to select, based on a predetermined condition, at least one image capturing means from image capturing means that have captured videos including the same target being monitored and control image capturing of the selected image capturing means or feeding of a video from the selected image capturing means.

18 Claims, 5 Drawing Sheets

(56) References Cited

U.S. PATENT DOCUMENTS

| | | | | |
|---|---|---|---|---|
| 2017/0208295 | A1* | 7/2017 | George | G06T 17/00 |
| 2021/0407108 | A1* | 12/2021 | Sharma | G06T 7/248 |

FOREIGN PATENT DOCUMENTS

| | | | | | |
|---|---|---|---|---|---|
| JP | 2006-245746 | A | | 9/2006 | |
| JP | 2008-167101 | A | | 7/2008 | |
| JP | 2011-114784 | A | | 6/2011 | |
| JP | 2016-045573 | A | | 4/2016 | |
| JP | 2018-143338 | A | | 9/2018 | |
| JP | 2019-114857 | A | | 7/2019 | |
| JP | 2020-194493 | A | | 12/2020 | |
| JP | 2021087103 | A | * | 6/2021 | H04N 7/18 |
| WO | 2017/212568 | A1 | | 12/2017 | |

OTHER PUBLICATIONS

JP Decision of Refusal and Decision of Dismissal of Amendment for JP Application No. 2023-553764, mailed on Aug. 5, 2025 with English Translation.

* cited by examiner

| PERSON ID | CHARACTERISTICS | SITUATION CONDITION | RISK LEVEL |
|---|---|---|---|
| P1 | SERIOUS | FALL | 10 |
| | | LOSS OF BALANCE | 8 |
| | | HEAD FOR STAIRS | 5 |
| | | WITH DOCTOR | -10 |
| P2 | MINOR | FALL | 7 |
| | | LOSS OF BALANCE | 5 |
| | | HEAD FOR STAIRS | 3 |
| | | WITH DOCTOR | -10 |

Fig. 4

MONITORING SYSTEM, MONITORING METHOD, NON-TRANSITORY COMPUTER-READABLE MEDIUM STORING PROGRAM

This application is a National Stage Entry of PCT/JP2021/037593 filed on Oct. 11, 2021, the contents of all of which are incorporated herein by reference, in their entirety.

TECHNICAL FIELD

The present disclosure relates to monitoring systems, monitoring methods, and non-transitory computer-readable media storing programs.

BACKGROUND ART

Various monitoring systems have been proposed that monitor motions of targets being monitored through monitoring images. Such a monitoring system typically includes an imaging device constituted, for example, by a plurality of monitoring cameras installed at a plurality of locations, and images of regions being monitored are captured continuously.

According to Patent Literature 1, for example, an image sensor installed around a user's bed at a hospital, a nursing home, or the like captures images of an imaging range, and a specific notification is issued when an anomaly in the user is detected from the user's behaviors. Meanwhile, according to Patent Literature 2, motions of a target being monitored in a monitoring image are recognized, and whether a motion of the target being monitored requires a response is determined.

CITATION LIST

Patent Literature

Patent Literature 1: Japanese Unexamined Patent Application Publication No. 2016-045573

Patent Literature 2: Japanese Unexamined Patent Application Publication No. 2020-194493

SUMMARY OF INVENTION

Technical Problem

With such monitoring systems, when various processes, such as a process of recognizing a motion of a target being monitored, are executed by a computation device disposed away from an image capturing device, monitoring images captured by a plurality of imaging devices are transmitted to the computation device via a network. If all of the plurality of monitoring images are transmitted, that may cause resource shortages, such as a shortage of communication resources or a shortage of human resources caused by an increased load on those who monitor the target being monitored based on the monitoring images.

The present disclosure is directed to providing a monitoring system, a monitoring method, and a non-transitory computer-readable medium storing a program capable of resolving resource shortages.

Solution to Problem

A monitoring system according to one aspect includes: a plurality of image capturing means installed at a plurality of locations within a region being monitored: identifying means configured to identify targets being monitored from videos captured by the plurality of image capturing means: determining means configured to determine whether, of the identified targets being monitored, the same target being monitored is in the videos of the plurality of image capturing means captured in the same time span; and controlling means configured to select, based on a predetermined condition, at least one image capturing means from image capturing means that have captured videos including the same target being monitored, and control image capturing of the selected image capturing means or feeding of a video from the selected image capturing means.

An information processing method according to one aspect includes:

identifying targets being monitored from videos captured by a plurality of image capturing means installed at a plurality of locations within a region being monitored: determining whether, of the identified targets being monitored, the same target being monitored is in the videos of the plurality of image capturing means captured in the same time span; and selecting, based on a predetermined condition, at least one image capturing means from image capturing means that have captured videos including the same target being monitored, and controlling image capturing of the selected image capturing means or feeding of a video from the selected image capturing means.

A non-transitory computer-readable medium according to one aspect stores a program that causes a computer to execute the processes of: identifying targets being monitored from videos captured by a plurality of image capturing means installed at a plurality of locations within a region being monitored: determining whether, of the identified targets being monitored, the same target being monitored is in the videos of the plurality of image capturing means captured in the same time span; and selecting, based on a predetermined condition, at least one image capturing means from image capturing means that have captured videos including the same target being monitored, and controlling image capturing of the selected image capturing means or feeding of a video from the selected image capturing means.

Advantageous Effects of Invention

The aspects above can provide a monitoring system, a monitoring method, and a non-transitory computer-readable medium storing a program capable of resolving resource shortages.

BRIEF DESCRIPTION OF DRAWINGS

FIG. 4 shows an example of a risk level calculating condition DB; and

EXAMPLE EMBODIMENT

Figure 1:
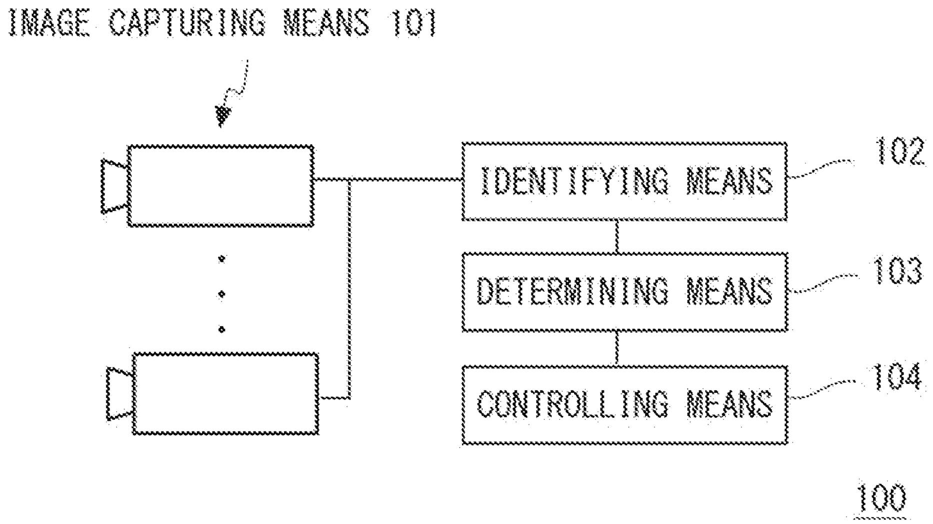
FIG. 1 is a block diagram showing a configuration of a monitoring system according to an example embodiment.

Hereinafter, some example embodiments of the present disclosure will be described with reference to the drawings.

In the following description and drawings, omissions and simplifications are made, as appropriate, to make the description clearer. In the drawings, identical elements are given identical reference characters, and their repetitive description will be omitted, as necessary. Specific numerical values and so forth illustrated below are merely examples for an easier understanding of the present disclosure, and are not to be limiting.

Example embodiments relate to a range of monitoring systems that monitor motions of targets being monitored, through monitoring videos. FIG. 1 is a block diagram showing a configuration of a monitoring system 100 according to an example embodiment. As shown in FIG. 1, the monitoring system 100 according to the example embodiment includes an image capturing means 101, an identifying means 102, and a determining means 103.

A plurality of image capturing means 101 are installed at a plurality of locations within a region being monitored and capture images of targets being monitored. The identifying means 102 identifies the targets being monitored from the videos captured by the plurality of image capturing means. The determining means 103 determines whether, of the identified targets being monitored, the same target being monitored is in the videos of the plurality of image capturing means captured in the same time span. A controlling means 104 selects, based on a predetermined condition, at least one image capturing means from image capturing means that have captured videos including the same target being monitored, and controls the image capturing of the selected image capturing means or the feeding of a video from the selected image capturing means.

Controlling the image capturing of the selected at least one image capturing means among the image capturing means that have captured the videos of the same target being monitored or controlling the feeding of the video from the selected at least one image capturing means in this manner can resolve resource shortages.

Figure 2:
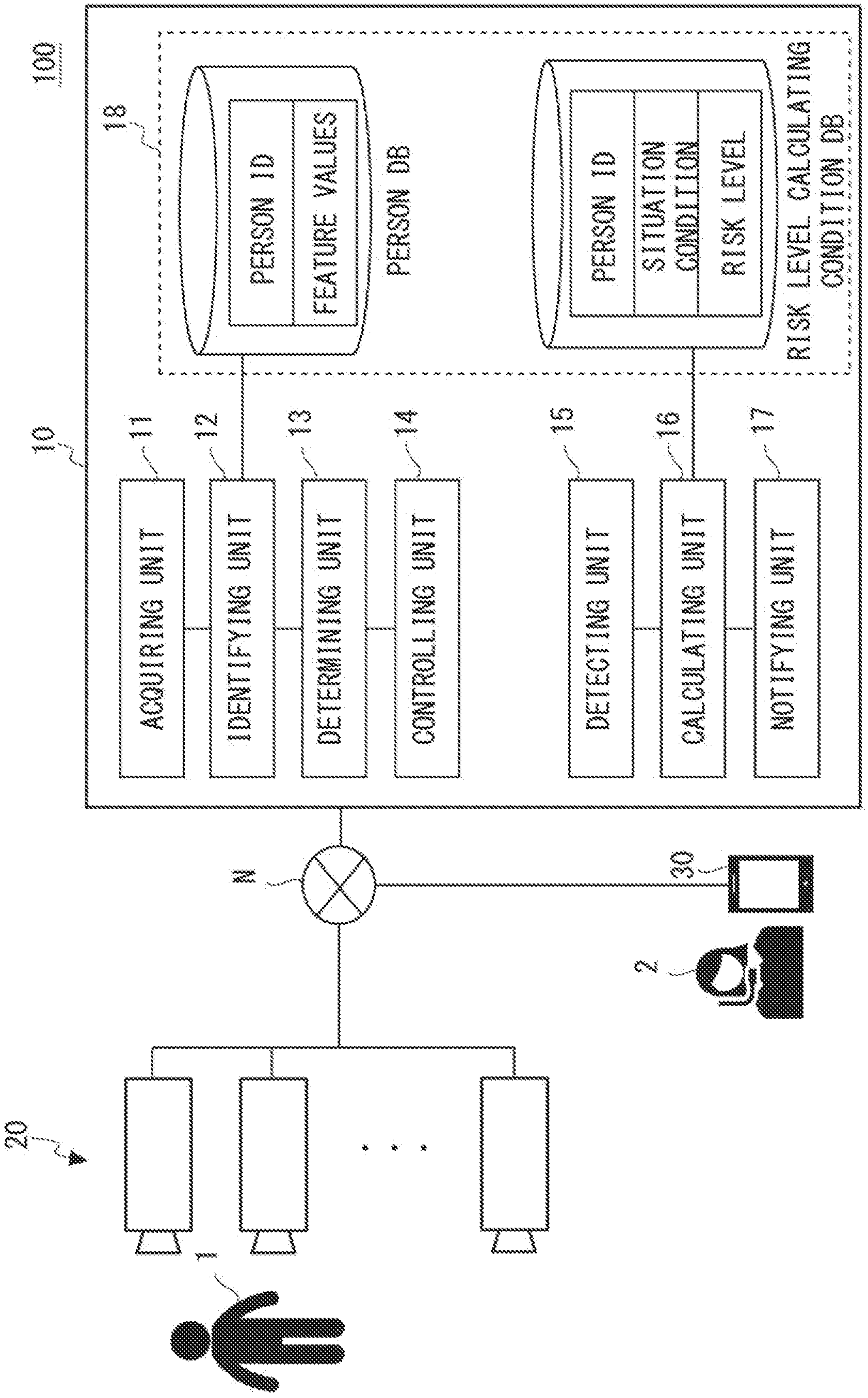
FIG. 2 shows an example of a configuration of a monitoring system that includes an incident detecting device according to an example embodiment.
Figure 3:
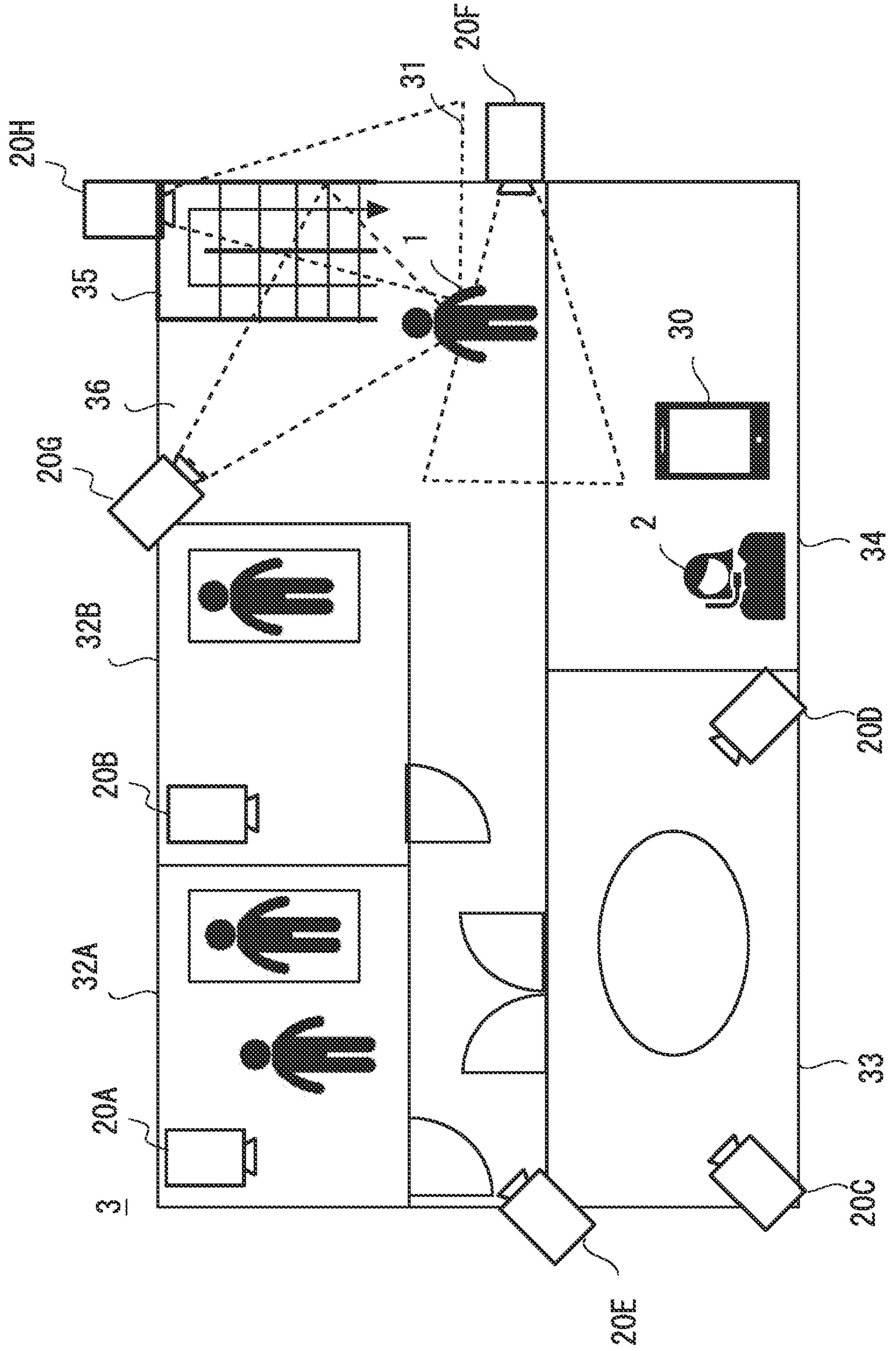
FIG. 3 shows an example of an arrangement of a plurality of image capturing devices within a hospital.

Next, a specific example of a monitoring system 100 according to an example embodiment will be described with reference to FIGS. 2 and 3. FIG. 2 shows an example of a configuration of a monitoring system 100 that includes an incident detecting device 10 according to an example embodiment. As shown in FIG. 2, this monitoring system 100 includes the incident detecting device 10, a plurality of image capturing devices 20, and a notifying device 30. FIG. 3 shows an example of an arrangement of the plurality of image capturing devices 20. In the following description, the plurality of image capturing devices are referred to as, collectively, image capturing devices 20 and, when individually referred to, are each denoted by a different reference character.

In the example shown in FIG. 2, the monitoring system 100 monitors, by monitoring videos, behaviors of targets being monitored, namely patients or care recipients, at, for example, a hospital or a nursing home. The monitoring system 100 grasps a motion of a target being monitored through, for example, image analysis, and issues a specific notification corresponding to the type of the motion grasped.

Herein, a target being monitored is not limited to a person and include an object that moves within a region being monitored, such as a cleaning robot or a transporting robot. In the example described below, the monitoring system 100 monitors a patient 1 as a target being monitored within a hospital. A monitor who monitors a patient 1 is a medical staff member 2. The monitoring system 100 can output a notification corresponding to a motion grasped of a patient 1 to the notifying device 30 and can thus inform a medical staff member 2 of a response request with regard to this patient 1.

In the monitoring system 100, the incident detecting device 10, the image capturing devices 20, and the notifying device 30 can be disposed at their appropriate positions away from each other. For example, the incident detecting device 10, the image capturing devices 20, and the notifying device 30 are connected by a network N and communicate with each other in real time. Herein, the network N is a communication network, such as the internet, a dedicated circuit, a 5G network, or an LTE network. If the network N is a public network, such as the internet, a closed network is preferably formed by, for example, a virtual private network (VPN). The aforementioned arrangement, however, does not limit the arrangement within the monitoring system 100. For example, part of the components of the incident detecting device 10 may be disposed within the image capturing devices 20.

The plurality of image capturing devices 20 are what are often called monitoring cameras and are installed at respective locations within a hospital. Each image capturing device 20 captures images of a predetermined image capturing range (image capturing angle of view) continuously at a predetermined image capturing rate, and generates moving image data composed of a plurality of time-series pieces of image data. The image capturing devices 20 may shift their image capturing ranges at a predetermined time.

Now, one example of an arrangement of the plurality of image capturing devices 20 will be described with reference to FIG. 3. In the example shown in FIG. 3, two private rooms 32A and 32B are located on one side of a corridor 31 running the middle of a hospital 3, and a communal space 33 and a monitoring room 34 are located on the other side of the corridor 31. Stairs 35 for moving from this floor to other floors are provided at one end of the corridor 31. A free space 36 is located between the stairs 35 and the private room 32B.

One image capturing device 20 is provided in each of the private rooms 32A and 32B where patients stay, and two image capturing devices 20 are provided in the communal space 33. For the sake of the description, the image capturing device installed in the private room 32A is denoted by 20A, the image capturing device installed in the private room 32B is denoted by 20B, and the image capturing devices provided in the communal space 33 are denoted by 20C and 20D. Meanwhile, image capturing devices 20E and 20F are provided at the respective ends of the corridor 31, an image capturing device 20G is provided in the free space 36, and an image capturing device 20H is provided in the stairs 35.

In FIG. 3, the image capturing ranges of the image capturing devices 20F, 20G, and 20H are indicated by dashed lines. As can be seen from the figure, a part of the image capturing range of the image capturing device 20F overlaps the image capturing range of the image capturing device 20G, and another part of the image capturing range of the image capturing device 20F overlaps the image capturing range of the image capturing device 20H. Therefore, an image of a patient 1 captured by the image capturing device 20F, 20G, or 20H is included in each of the images generated by the image capturing devices 20F, 20G, and 20H.

The notifying device 30 that receives a notification from the incident detecting device 10 is installed in the monitoring room 34, where a medical staff member 2 stays. The notifying device 30 may be, for example, a tablet terminal or smartphone that can receive input or provide output through a personal computer or a touch panel. The notifying device 30 may be a dedicated device or may be realized as a dedicated application is installed into a general-purpose information terminal. It is preferable that, in the monitoring system 100, a small-sized information terminal that a medical staff member 2 carries outside the monitoring room 34 be configured to be capable of being used as a notifying device 30.

FIG. 2 shows, in addition to a hardware configuration of the incident detecting device 10, logical functional blocks that execute computation processes necessary for the monitoring or computation processes for resolving resource shortages. As shown in FIG. 2, the incident detecting device 10 includes an acquiring unit 11, an identifying unit 12, a determining unit 13, a controlling unit 14, a detecting unit 15, a calculating unit 16, a notifying unit 17, and a storage unit 18, and these units are interconnected by a bus (not shown). The incident detecting device 10 is a computational processing device, such as a central processing unit (CPU) or a graphics processing unit (GPU).

The identifying unit 12, the determining unit 13, the controlling unit 14, the detecting unit 15, the calculating unit 16, and the notifying unit 17 correspond to, respectively, identifying means, determining means, controlling means, detecting means, calculating means, and notifying means set forth in the claims. The storage unit 18 includes a person database (DB) and a risk level calculating condition DB.

The acquiring unit 11 acquires monitoring videos that the plurality of image capturing devices 20 have captured during a monitoring operation. The identifying unit 12, by referring to the person DB in the storage unit 18, detects a target or targets being monitored from the videos captured by the plurality of image capturing devices 20, and identifies a patient or patients 1. The person DB has registered therein, for example, feature values pertaining to the face image of each patient 1, or each target being monitored, with the feature values linked to the person ID identifying the patient 1.

In this case, the identifying unit 12 can identify each patient 1 by extracting face regions of persons included in monitoring videos and by comparing the face regions against the feature values stored in the person DB. This example, in which the identifying unit 12 identifies each patient 1 based on the face image of the patient 1, is not a limiting example, and the identifying unit 12 may identify each patient 1 based, for example, on the body shape, gait, or built of the patient 1. Furthermore, the identifying unit 12 may identify a patient 1 through a combination of a plurality of features.

A target being monitored can be identified with the use of a range of known image analyzing methods. For example, the identifying unit 12 can be constituted by an image analyzing device of a machine learning type provided with a neural network. The identifying unit 12 preferably identifies a plurality of targets being monitored simultaneously in parallel.

The determining unit 13 determines whether, of the identified patients 1, the same patient 1 is in the videos of the plurality of image capturing devices 20 captured in the same time span (at the same time). As described above, in the example shown in FIG. 3, the image capturing devices 20F, 20G, and 20H capture images of the same patient 1. The determining unit 13 determines the image capturing devices 20F, 20G, and 20H to be the image capturing means that have captured the videos including the same patient 1.

As described above, transmitting all of the monitoring videos captured by the plurality of image capturing devices 20 to the incident detecting device 10 increases the network load, which may cause a shortage of communication resources. Furthermore, in the case of a network of a volume charging type, the communication cost increases. Therefore, according to the example embodiment, the controlling unit 14 selects, based on a predetermined condition, at least one image capturing device 20 from the image capturing devices 20 that have captured the videos including the same patient 1 and controls the image capturing of the selected image capturing device 20 or the feeding of the video from the selected image capturing device 20.

The predetermined condition can be, for example, the orientation of or the range captured of the same patient 1, such as whether the monitoring videos capturing the same patient 1 includes the face of the patient 1, whether they include the entire body of the patient 1, or whether the patient 1 is facing the image capturing device 20 in the monitoring videos capturing the same patient 1.

For example, a monitoring video that captures the entire body of a patient 1 allows for the detection of loss of balance of the patient 1. As another example, a monitoring video that captures the face of a patient 1 allows for the measurement of the patient's biometric information.

Herein, biometric information is information concerning a living body that can be measured from a person's image, and examples of such include the heart rate, the blood pressure level, and the oxygen saturation. Biometric information can be obtained from a monitoring video including the face of a patient 1 and based on information indicating any change in the state of the body surface.

An example of such information indicating a change in the state of the body surface is, for example, a change in the color of the body surface caused by a change in the blood flow in the patient. Each frame of video data capturing a patient includes a change in the color of the patient's body surface. For example, when the breathing of a patient 1 in a monitoring video seems labored, the saturation of percutaneous oxygen ($SpO_2$, oxygen saturation, hereinafter) of the patient 1 can be measured based on the monitoring video.

The oxygen saturation indicates the percentage of oxygenated hemoglobin in the blood. The intensity of light reflected upon the light hitting the body surface, such as the face, changes by time due to a change in the hemoglobin level in the blood vessels. The incident detecting device 10 can estimate $SpO_2$ by analyzing a video. In this manner, the controlling unit 14 selects at least one image capturing device 20 from the image capturing means that have captured the videos including the same patient 1, in accordance with a purpose.

Then, the controlling unit 14 controls the image capturing of the selected image capturing device 20 or the feeding of a video from the selected image capturing device 20. The "controlling the image capturing" includes, for example, changing an image quality by controlling the start or stop of the image capturing of the image capturing device 20 or by controlling the optical zoom or digital zoom of the image capturing device 20. The "controlling the feeding of a video" includes, for example, changing an image quality by controlling the start and stop of the feeding of the video from the image capturing device 20 or by changing the compression rate of the monitoring video to be transmitted from the image capturing device 20 to the incident detecting device 10.

When transmitting a monitoring image, an image capturing device 20 typically compression-encodes the monitoring image to reduce the data size. Setting the compression rate of a target region lower than the compression rate of regions other than the target region can produce data in which the image quality of the target region is higher than the image quality of the regions other than the target region, while reducing the data size of the entire monitoring image. For example, when the oxygen saturation of a patient 1 is to be measured, varying the compression rate can produce an image in which the face region (target region) of the patient 1 in the monitoring video has a higher image quality than regions other than the face region.

Thus, as compared to a case in which the entire video data is transmitted without being compressed or a case in which the entire video data is transmitted upon being compressed uniformly at a certain compression rate, an image can be acquired in which the region necessary for measuring biometric information has a higher image quality than the remaining regions while saving communication resources, and the biometric information can be measured with high reliability.

Another example of the predetermined condition can be the environment surrounding the patient 1 within the image capturing ranges of the respective image capturing devices 20. For example, the controlling unit 14 can select, from the image capturing devices 20F, 20G, and 20H that have captured videos including the same patient 1, the image capturing device 20H that captures an image of the stairs 35 (area that needs watching), where the patient 1 might fall.

The controlling unit 14 can control the image capturing devices 20 so as to transmit, to the incident detecting device 10, only the monitoring video of the image capturing device 20H installed to include such an area that needs watching in its image capturing range and so as not to transmit the monitoring videos of the other image capturing devices (image capturing devices 20F and 20G). Such control can prevent an increase in the network traffic.

When one monitoring video includes the entire body of a patient 1 and the other monitoring video includes the face region of the same patient 1, the controlling unit 14 can select both of the image capturing devices 20 that have captured these monitoring videos. Selecting a plurality of image capturing devices 20 in this manner makes it possible to detect the loss of balance from the monitoring video of one of the image capturing devices 20 and to measure the oxygen saturation with the monitoring video of the other image capturing device 20.

In the case above, when the controlling unit 14 selects a plurality of image capturing devices 20, the controlling unit 14 can perform such control that causes a different process to be carried out in each of the selected image capturing devices 20. Specifically, in one of the image capturing devices 20, a process of cutting out, from the monitoring video, only the region surrounding the patient 1 that is necessary for detecting his or her loss of balance can be performed. Meanwhile, in the other image capturing device 20, the image quality of the face region of the patient 1 can be set higher than the image quality of regions other than the face region in order to measure the oxygen saturation. This makes it possible for a medical staff member 2 to check the condition of the patient 1 more reliably.

When a patient 1 is not included in a monitoring video and/or when there is no movement in a monitoring video, the controlling unit 14 performs control of stopping the feed of such a monitoring video from the image capturing device 20 that has captured the video. In other words, only those image capturing devices capturing videos that include a patient 1 making some motion in the monitoring images transmit the monitoring images to the incident detecting device 10. This can reduce the amount of data of the monitoring images transmitted from the image capturing devices 20 to the incident detecting device 10, saving the communication resources. When a person other than a patient 1 is in the monitoring video of a selected image capturing device 20, the image quality of the region containing that person as well as the region containing the patient 1 can be set higher than the image quality of the remaining regions.

There is a need that, when a patient 1 is in a situation that needs to be attended to within a hospital 3, such a situation can be detected automatically to allow a medical staff member 2 to respond quickly. A situation that needs to be attended to includes, for example, a case in which a patient loses his or her balance due to a health problem, a case in which a patient enters an area that needs watching, or a case in which a patient 1 who needs an attendant moves around alone.

However, since different patients 1 have different characteristics, such as different symptoms or different personality traits, the level of the risk that the patients 1 face in a given situation differs between the patients 1. If a medical staff member 2 responds to each of the notifications issued across the board even in a case in which the risk level is low for a given patient 1, the workload of the medical staff member 2 increases, leading to a possible shortage of human resources, and the psychological burden on the patients increases as well.

In this respect, a configuration for resolving a shortage of human resources will be described below. The detecting unit 15 acquires a video captured after the image capturing or the feeding of a video has been controlled by the controlling unit 14, and detects the situation of the patient 1 in the acquired video. For example, the detecting unit 15 can acquire a video whose compression rate has been controlled such that a predetermined target region has a higher image quality than regions other than the target region.

Examples of the situation of a patient 1 that the detecting unit 15 detects includes a motion of the patient 1, such as loss of balance of the patient 1, his or her entry into or exit from a room, or a place where he or she is headed. Such a motion can be detected through a range of known image analyzing methods. For example, the detecting unit 15 may be constituted by an image recognition device that uses deep learning technology.

The place where a patient is headed can be inferred based on the installation position of the image capturing device 20 that has captured the image and the orientation of the feet of the patient 1. The situation of a patient 1 also includes, for example, whether an attendant, such as a medical staff member 2 or a family member, is present or the biometric information, such as the heart rate or the oxygen saturation, described above.

The calculating unit 16, by referring to the risk level calculating condition DB in the storage unit 18, calculates the risk level based on the condition set in advance for each patient 1 and the situation of the patient 1. The risk level calculating condition DB stores, for example, the risk levels corresponding to the respective situation conditions linked to each person ID. FIG. 4 shows an example of the risk level calculating condition DB.

As shown in FIG. 4, the risk level calculating condition DB stores, for each person ID serving as the identification information of the patient 1, a combination of the symptoms, situation conditions, and risk levels of the patient 1. The risk levels are set individually for each patient 1. Specifically, according to the example embodiment, the risk level of each motion of a patient 1 is assigned different values depending on the symptoms.

For example, with regard to the same situation condition "loss of balance," a patient (P1) with more serious symptoms is assigned a higher risk level value than a patient (P2) with minor symptoms. Although the risk level value differs depending only on the symptoms of each patient 1, the risk level value may be set according to two or more characteristics, including not only the symptoms but also other factors such as personality traits.

For example, the risk level can be raised for the case in which the patient (P1) with serious symptoms leaves the room and stays out for a predetermined length of time, or the risk level can be raised for the case in which the patient (P1) with serious symptoms is headed for an area that needs watching, such as the stairs. Different risk level values may be set between when a patient 1 is in his or her private room and the patient 1 is in the communal space 33. The risk level calculating condition DB can be overwritten to lower the risk level value when a symptom of the patient 1 has improved.

The notifying unit 17 outputs notification information to a predetermined notification recipient based on the risk level calculated by the calculating unit 16. The predetermined notification recipient includes, for example, the notifying device 30 installed in the monitoring room 34, a small-sized information terminal that a medical staff member 2 carries outside the monitoring room 34, a nurse call system, or a speaker at a nurses station. The notifying unit 17 may output notification information only to a limited notification recipient, such as an information terminal that the medical staff member 2 in charge of the identified patient 1 carries or an information terminal that the medical staff member 2 closest to the patient 1 carries.

Notification information includes the identified patient 1, the location of the patient 1, and the risk level. The notifying device 30 can output the notification information from the notifying unit 17 in the form of, for example, a video, letters, or audio that a medical staff member 2 can recognize. When the risk level is higher than or equal to a predetermined threshold, the notifying device 30 can vary the contents of the notification depending on the risk level. The contents of a notification include, for example, the loudness of a warning sound, the display size, and the typeface. For example, the notifying device 30 generates a louder warning sound as the risk level is higher, so that the medical staff member 2 can recognize the urgency.

In this manner, varying the contents of the notification depending on the risk level that takes the characteristics of the patient 1 into consideration can reduce the load on the medical staff member 2, as compared to a case in which a notification is issued across the board.

The storage unit 18 is, for example, a non-volatile storage device, such as a hard-disk drive (HDD), a solid-state drive (SSD), or a flash memory. The storage unit 18 stores a program that implements each function of the constituent elements of the incident detecting device 10. As the incident detecting device 10 executes this program, each function of the constituent elements of the incident detecting device 10 is implemented.

The storage unit 18 may include a memory, such as a random-access memory (RAM) or a read-only memory (ROM). When executing the aforementioned program, the incident detecting device 10 may execute the program upon loading it onto the memory or may execute the program without loading it onto the memory. As described above, the storage unit 18 stores the person DB and the risk level calculating condition DB.

The identifying unit 12 can, by referring to the person DB in the storage unit 18, identify the type of each person included in the videos captured by the plurality of image capturing devices 20. The person DB may include, in addition to the feature values of the face images of patients 1 being monitored, feature values of the face image of a medical staff member 2, such as a doctor or a nurse, or of the face image of an attendant to a patient 1. The identifying unit 12 can classify a person recognized in a video into one of such types as "patient," "medical staff member," and "attendant." Of the type "patient," for example, a person with serious symptoms and in particular needing to be attended to by a medical staff member 2 can be further classified into the type "person who needs watching."

The identifying unit 12 can identify the type of each person through a range of known methods and can identify the type based, for example, on the clothing, posture, or gait of the person in the video. The controlling unit 14 can change the image quality of the video captured by the selected image capturing device 20 in accordance with the type of the person in the video of that image capturing device 20.

When a selected image capturing device 20 transmits a video, the video can be transmitted with the image quality of a person of a type other than the type of a patient 1 set lowered than the image quality of the patient 1. As the video is transmitted with the image quality of the person of a type other than the type of the patient 1 set lower than the image quality of the patient 1, the amount of data can be reduced, and the tracking of the patient 1 can be facilitated. When a patient can be confirmed not to be a person who needs watching based on his or her face image, posture, or gait, the video can be transmitted with a reduced image quality, as described above.

When a video is transmitted from, among the selected image capturing devices 20, an image capturing device 20 capturing an image of an area that needs watching, such as the stairs where a fall happens frequently, the image quality of all the patients 1, even if they are not persons who need watching, can be set higher than the image quality of the surrounding regions. When patients 1 are in an unusual location as well, the image quality of all the patients 1, even if they are not persons who need watching, can be set higher than the image quality of the surrounding regions.

In order to collect information used to identify a target being monitored, such as the body shape or gait of the target being monitored, for example, the image quality of a region where the target being monitored is in the monitoring video of the image capturing device 20 installed in the corridor can be set higher than the image quality of the remaining regions. This can improve the recognition accuracy of each person with detailed characteristics of a plurality of patients further reflected in the recognition.

The detecting unit 15 can determine whether a patient 1 is with another person. When a patient 1 is with another person within a predetermined distance for a predetermined length of time, for example, the detecting unit 15 can determine that the patient 1 is with another person. When the patient 1 is with another person, the calculating unit 16 can lower the risk level. The amount by which the risk level calculated by the calculating unit 16 is lowered can be varied in accordance with the type of the other person whom the patient 1 is with.

For example, when a patient 1 is with a medical staff member 2, even if the patient 1 falls into a dangerous situation, the medical staff member 2 can promptly check the situation and attend to the patient 1, and thus the amount by which the risk level is lowered can be set so as not for the notification information to be output to the notifying device 30. Meanwhile, when a patient 1 is with an attendant, the amount by which the risk level is lowered may be set smaller than the amount by which the risk level is lowered when the patient 1 is with a medical staff member 2.

Figure 5:
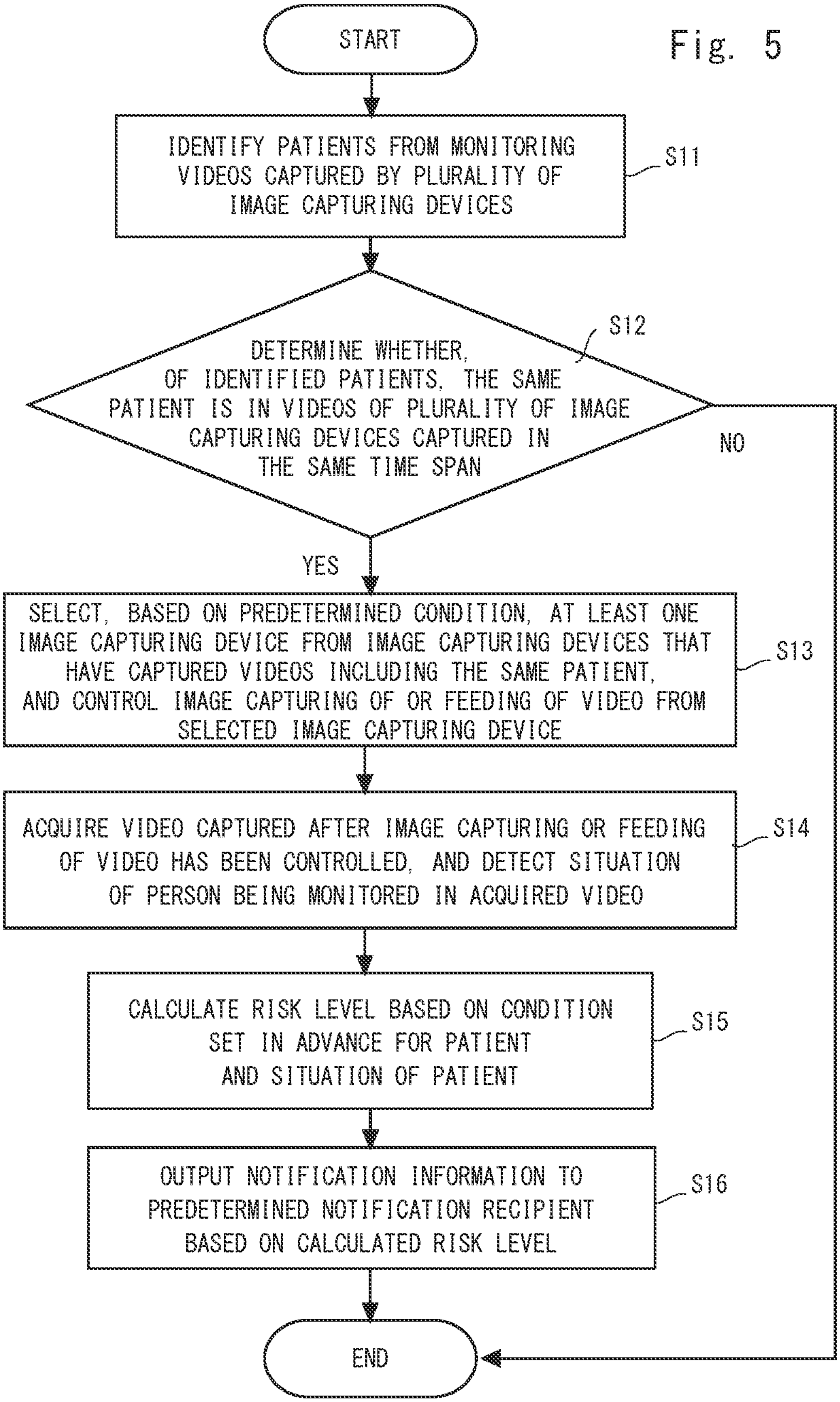
FIG. 5 is a flowchart for describing an example of a flow of a monitoring method according to an example embodiment.

Now, a monitoring method according to the example embodiment will be described with reference to FIG. 5. FIG. 5 is a flowchart for describing an example of a flow of the monitoring method according to the example embodiment. First, the identifying unit 12 identifies a patient 1 from monitoring videos captured by a plurality of image capturing devices 20 installed at a plurality of locations within a region being monitored (S11). Then, the identifying unit 12 determines whether, of the identified patients 1, the same patient 1 is in the monitoring videos of the plurality of image capturing devices 20 captured in the same time span (S12).

If none of the monitoring videos captures the same patient 1 (S12, NO), the process is terminated. If the same patient 1 is in the monitoring videos (S12, YES), at least one image capturing device 20 is selected based on a predetermined condition from the image capturing devices 20 that have captured the monitoring videos including the same target being monitored, and the image capturing of the selected image capturing device 20 or the feeding of the video from the selected image capturing device 20 is controlled (S13).

For example, the image capturing device 20 transmits, to the incident detecting device 10, a monitoring video in which a specific region (e.g., face region) of the same patient 1 has a higher image quality than the remaining regions. Thus, as compared to a case in which the entire video data is transmitted without being compressed or a case in which the entire video data is transmitted upon being compressed uniformly at a certain compression rate, an image can be acquired in which the region necessary for measuring biometric information has a higher image quality than the remaining regions while saving communication resources, and the biometric information can be measured with high reliability.

If the patient 1 serving as a person being monitored is identified, the detecting unit 15 acquires a video captured after the image capturing or the feeding of the video has been controlled by the controlling unit 14, and detects the situation of the person being monitored in the acquired video (S14). Then, the risk level is calculated based on the condition set in advance for the patient 1 and the situation of the patient 1 serving as the person being monitored (S15). Then, notification information is output to a predetermined notification recipient based on the calculated risk level (S16). As described above, the biometric information can be measured with high reliability: thus, treatment appropriate for the person can be provided, and the work load of the medical staff member 2 can be reduced.

As described above, according to the example embodiment, from among the plurality of image capturing devices 20 that capture monitoring images, at least one image capturing device 20 is selected based on a predetermined condition from the image capturing devices 20 that have captured the monitoring videos including the same target being monitored, and the image capturing of the selected image capturing device 20 or the feeding of the video from the selected image capturing device 20 is controlled. This makes it possible to resolve resource shortages.

Each functional block that performs various processes shown in the drawings can be constituted, in terms of hardware, by a processor, a memory, and other circuits. The processes described above can also be implemented as a processor is caused to execute a program. Therefore, these functional blocks can be implemented in a variety of forms, including hardware alone, software alone, or a combination thereof, none of which is a limiting example.

The program described above can be stored with the use of various types of non-transitory computer-readable media and supplied to a computer. Non-transitory computer-readable media include various types of tangible storage media. Examples of non-transitory computer-readable media include a magnetic recording medium (e.g., flexible disk, magnetic tape, hard-disk drive), a magneto-optical recording medium (e.g., magneto-optical disk), a CD-read-only memory (ROM), a CD-R, a CD-R/W, and a semiconductor memory (e.g., mask ROM, programmable ROM (PROM), erasable PROM (EPROM), flash ROM, random-access memory (RAM)). The program may also be supplied to a computer by various types of transitory computer-readable media. Examples of such transitory computer-readable media include an electric signal, an optical signal, and an electromagnetic wave. A transitory computer-readable medium can supply a program to a computer via a wired communication line, such as an electric wire or an optical fiber, or via a wireless communication line.

Thus far, the present disclosure has been described with reference to some example embodiments, but the foregoing example embodiments do not limit the present disclosure. Various modifications that a person skilled in the art can appreciate within the scope of the present disclosure can be made to the configurations and details of the present disclosure.

Part or the whole of the foregoing example embodiments can also be stated as in the following supplementary notes, which are not limiting.

Supplementary Note 1

A monitoring system comprising:
- a plurality of image capturing means installed at a plurality of locations within a region being monitored;
- identifying means configured to identify targets being monitored from videos captured by the plurality of image capturing means;
- determining means configured to determine whether, of the identified targets being monitored, the same target being monitored is in the videos of the plurality of image capturing means captured in the same time span; and
- controlling means configured to select, based on a predetermined condition, at least one image capturing means from image capturing means that have captured videos including the same target being monitored, and control image capturing of the selected image capturing means or feeding of a video from the selected image capturing means.

Supplementary Note 2

The monitoring system according to Supplementary Note 1, wherein the controlling means is configured to, if the video includes the target being monitored, control the selected image capturing means so as to change an image quality of the video.

Supplementary Note 3

The monitoring system according to Supplementary Note 2, wherein the identifying means is configured to identify a type of a person included in the video, and the controlling means is configured to change the image quality in accordance with the type of the person in the video captured by the selected image capturing means.

Supplementary Note 4

The monitoring system according to Supplementary Note 2 or 3, wherein the controlling means is configured to set the image quality of a target region that includes the target being monitored in the video higher than the image quality of a region other than the target region when transmitting the video captured by the image capturing means, by performing control of setting a compression rate of the target region lower than a compression rate of the region other than the target region.

Supplementary Note 5

The monitoring system according to any one of Supplementary Notes 1 to 4, wherein the controlling means is configured to select at least one image capturing means in accordance with an environment surrounding the target being monitored within an image capturing range of each of the plurality of image capturing means, and perform control of transmitting only a video captured by the selected image capturing means.

Supplementary Note 6

The monitoring system according to any one of Supplementary Notes 1 to 5, wherein the controlling means is configured to, if the video does not include a target being monitored and/or if the video does not capture any motion, perform control of stopping the feeding of the video from the image capturing means that has captured the video.

Supplementary Note 7

The monitoring system according to any one of Supplementary Notes 1 to 6, wherein the controlling means is configured to, if a plurality of image capturing means have been selected, perform such control that causes different processes to be performed in the selected plurality of image capturing means.

Supplementary Note 8

The monitoring system according to any one of Supplementary Notes 1 to 7, further comprising:

if the identifying means has identified a person being monitored as a target being monitored, detecting means configured to acquire a video captured after the image capturing or the feeding of the video has been controlled by the controlling means, and detect a situation of the person being monitored in the acquired video;

calculating means configured to calculate a risk level based on a condition set in advance for the person being monitored and the situation of the person being monitored; and notifying means configured to output notification information to a predetermined notification recipient based on the risk level.

Supplementary Note 9

The monitoring system according to Supplementary Note 8, wherein the controlling means is configured to change the image quality in accordance with the situation of the person being monitored in the video captured by the selected image capturing means.

Supplementary Note 10

The monitoring system according to Supplementary Note 8 or 9, wherein the detecting means is configured to determine whether the person being monitored is with an other person, and the calculating means is configured to lower the risk level, if the person being monitored is with the other person.

Supplementary Note 11

The monitoring system according to Supplementary Note 10, wherein the calculating means is configured to change an amount by which the risk level is lowered in accordance with a type of the other person.

Supplementary Note 12

A monitoring method comprising:

identifying targets being monitored from videos captured by a plurality of image capturing means installed at a plurality of locations within a region being monitored;

determining whether, of the identified targets being monitored, the same target being monitored is in the videos of the plurality of image capturing means captured in the same time span; and selecting, based on a predetermined condition, at least one image capturing means from image capturing means that have captured videos including the same target being monitored, and controlling image capturing of the selected image capturing means or feeding of a video from the selected image capturing means.

Supplementary Note 13

The monitoring method according to Supplementary Note 12, wherein, if the video includes the target being monitored, the selected image capturing means is controlled so as to change an image quality of the video.

Supplementary Note 14

The monitoring method according to Supplementary Note 12, wherein a type of a person included in the video is identified, and the image quality is changed in accordance with the type of the person in the video captured by the selected image capturing means.

Supplementary Note 15

The monitoring method according to Supplementary Note 12 or 13, wherein the image quality of a target region that includes the target being monitored in the video is set higher than the image quality of a region other than the target region when the video captured by the image capturing means is transmitted, by performing control of setting a compression rate of the target region lower than a compression rate of the region other than the target region.

Supplementary Note 16

The monitoring method according to any one of Supplementary Notes 12 to 15, wherein at least one image capturing means is selected in accordance with an environment surrounding the target being monitored within an image capturing range of each of the plurality of image capturing means, and control is performed of transmitting only a video captured by the selected image capturing means.

Supplementary Note 17

The monitoring method according to any one of Supplementary Notes 12 to 16, wherein, if the video does not include a target being monitored and/or if the video does not capture any motion, control is performed of stopping the feeding of the video from the image capturing means that has captured the video.

Supplementary Note 18

The monitoring method according to any one of Supplementary Notes 12 to 17, wherein, if a plurality of image capturing means have been selected, such control is performed that causes different processes to be performed in the selected plurality of image capturing means.

Supplementary Note 19

The monitoring method according to any one of Supplementary Notes 12 to 18, further comprising:

if a person being monitored is identified as a target being monitored, acquiring a video captured after the image capturing or the feeding of the video has been controlled, and detecting a situation of the person being monitored that is the target being monitored in the acquired video;

calculating a risk level based on a condition set in advance for the person being monitored and the situation of the person being monitored; and outputting notification information to a predetermined notification recipient based on the risk level.

Supplementary Note 20

The monitoring method according to Supplementary Note 19, wherein the image quality is changed in accordance with the situation of the person being monitored in the video captured by the selected image capturing means.

Supplementary Note 21

The monitoring method according to Supplementary Note 19 or 20, wherein whether the person being monitored is with an other person is determined, and the risk level is lowered, if the person being monitored is with the other person.

Supplementary Note 22

The monitoring method according to Supplementary Note 21, wherein an amount by which the risk level is lowered is changed in accordance with a type of the other person.

Supplementary Note 23

A non-transitory computer-readable medium storing a program that causes a computer to execute the processes of:

identifying targets being monitored from videos captured by a plurality of image capturing means installed at a plurality of locations within a region being monitored;

determining whether, of the identified targets being monitored, the same target being monitored is in the videos of the plurality of image capturing means captured in the same time span; and selecting, based on a predetermined condition, at least one image capturing means from image capturing means that have captured videos including the same target being monitored, and controlling image capturing of the selected image capturing means or feeding of a video from the selected image capturing means.

REFERENCE SIGNS LIST

1 PATIENT
2 MEDICAL STAFF MEMBER
3 HOSPITAL
10 INCIDENT DETECTING DEVICE
11 ACQUIRING UNIT
12 IDENTIFYING UNIT
13 DETERMINING UNIT
14 CONTROLLING UNIT
15 DETECTING UNIT
16 CALCULATING UNIT
17 NOTIFYING UNIT
18 STORAGE UNIT
20 IMAGE CAPTURING DEVICE
30 NOTIFYING DEVICE
31 CORRIDOR
32A, 32B PRIVATE ROOM
33 COMMUNAL SPACE
34 MONITORING ROOM
35 STAIRS
36 FREE SPACE
100 MONITORING SYSTEM
101 IMAGE CAPTURING MEANS
102 IDENTIFYING MEANS
103 DETERMINING MEANS
104 CONTROLLING MEANS
N NETWORK

What is claimed is:

1. A monitoring system comprising:

a plurality of image capturing devices installed at a plurality of locations within a region being monitored;

at least one memory storing instructions; and at least one processor configured to execute the instructions to;

identify targets being monitored from videos captured by the plurality of image capturing devices;

determine whether, of the identified targets being monitored, a same target being monitored is in the videos of the plurality of image capturing devices captured in a same time span; and select, based on a predetermined condition, at least one image capturing device from among the image capturing devices that have captured videos including the same target being monitored, and control image capturing of the selected image capturing device or feeding of a video from the selected image capturing device, wherein the region being monitored comprises a plurality of rooms and a corridor for accessing the rooms, the plurality of image capturing devices includes an image capturing device provided in each of the plurality of rooms and an imaging capturing device disposed in the corridor for capturing videos along the corridor, the at least one processor is further configured to execute the instructions to, if the video of the selected image capturing device includes the target being monitored, control the selected image capturing device so as to change an image quality of the video, and if the selected image capturing device is provided in the corridor, control the selected image capturing device so that an image quality of the video captured by the selected image capturing device is higher than an image quality of a video captured by an image capturing device provided in a location other than the corridor.

2. The monitoring system according to claim 1, wherein at least one processor is further configured to execute the instructions to identify a type of a person included in the video, and change the image quality in accordance with the type of the person in the video captured by the selected image capturing device.

3. The monitoring system according to claim 1, wherein at least one processor is further configured to execute the instructions to set the image quality of a target region that includes the target being monitored in the video higher than the image quality of a region other than the target region when transmitting the video captured by the image capturing-device, by performing control of setting a compression rate of the target region lower than a compression rate of the region other than the target region.

4. The monitoring system according to claim 1, wherein at least one processor is further configured to execute the instructions to select at least one image capturing device in accordance with an environment surrounding the target being monitored within an image capturing range of each of the plurality of image capturing device, and perform control of transmitting only a video captured by the selected image capturing device.

5. The monitoring system according to claim 1, wherein at least one processor is further configured to execute the instructions to, if the video does not include a target being monitored and/or if the video does not capture any motion, perform control of stopping the feeding of the video from the image capturing device that has captured the video.

6. The monitoring system according to claim 1, wherein at least one processor is further configured to execute the instructions to, if a plurality of image capturing device have been selected, perform control that causes different processes to be performed in the selected plurality of image capturing device.

7. The monitoring system according to claim 1, wherein, if a person being monitored has been identified as a target being monitored, at least one processor is further configured to execute the instructions to;

acquire a video captured after the image capturing or the feeding of the video has been controlled, and detect a situation of the person being monitored in the acquired video;

calculate a risk level based on a condition set in advance for the person being monitored and the situation of the person being monitored; and output notification information to a predetermined notification recipient based on the risk level.

8. The monitoring system according to claim 7, wherein at least one processor is further configured to execute the instructions to change the image quality in accordance with the situation of the person being monitored in the video captured by the selected image capturing device.

9. The monitoring system according to claim 7, wherein at least one processor is further configured to execute the instructions to;

determine whether the person being monitored is with an other person, and lower the risk level, if the person being monitored is with the other person.

10. The monitoring system according to claim 9, wherein at least one processor is further configured to execute the instructions to change an amount that the risk level is lowered in accordance with a type of the other person.

11. A monitoring method comprising, wherein a computer identifies targets being monitored from videos captured by a plurality of image capturing devices installed at a plurality of locations within a region being monitored;

determines whether, of the identified targets being monitored, a same target being monitored is in the videos of the plurality of image capturing devices captured in a same time span; and selects, based on a predetermined condition, at least one image capturing device from among the image capturing devices that have captured videos including the same target being monitored, and controls image capturing of the selected image capturing device or feeding of a video from the selected image capturing device, wherein the region being monitored comprises a plurality of rooms and a corridor for accessing the rooms, the plurality of image capturing devices includes an image capturing device provided in each of the plurality of rooms and an imaging capturing device disposed in the corridor for capturing videos along the corridor, the computer controls the selected image capturing device, if the video of the selected image capturing device includes the target being monitored, so as to change an image quality of the video, and controls the selected image capturing device, if the selected image capturing device is provided in the corridor, so that an image quality of the video captured by the selected image capturing device is higher than an image quality of a video captured by an image capturing device provided in a location other than the corridor.

12. The monitoring system according to claim 1, wherein, the region being monitored is a healthcare facility, targets being monitored are persons to be checked by a staff of the healthcare facility, and at least one processor is further configured to execute the instruction to;

identify targets using an image analyzing of a machine learning type, acquire a video captured after the image capturing or the feeding of the video has been controlled, and detect a situation of the persons in the acquired video; and make a decision to output notification information to the staff based on the situation of the person.

13. The monitoring method according to claim 11, wherein a type of a person included in the video is identified, and the image quality is changed in accordance with the type of the person in the video captured by the selected image capturing device.

14. The monitoring method according to claim 11, wherein the image quality of a target region that includes the target being monitored in the video is set higher than the image quality of a region other than the target region when the video captured by the image capturing device is transmitted, by performing control of setting a compression rate of the target region lower than a compression rate of the region other than the target region.

15. The monitoring method according to claim 11, wherein at least one image capturing device is selected in accordance with an environment surrounding the target being monitored within an image capturing range of each of the plurality of image capturing device, and control is performed of transmitting only a video captured by the selected image capturing device.

16. The monitoring method according to claim 11, wherein, if the video does not include a target being monitored and/or if the video does not capture any motion, control is performed of stopping the feeding of the video from the image capturing device that has captured the video.

17. The monitoring method according to claim 11, wherein, if a plurality of image capturing device have been selected, such control is performed that causes different processes to be performed in the selected plurality of image capturing device.

18. A non-transitory computer-readable medium storing a program that causes a computer to execute the processes of:

identifying targets being monitored from videos captured by a plurality of image capturing devices installed at a plurality of locations within a region being monitored;

determining whether, of the identified targets being monitored, a same target being monitored is in the videos of the plurality of image capturing devices captured in a same time span; and selecting, based on a predetermined condition, at least one image capturing device from among the image capturing devices that have captured videos including the same target being monitored, and controlling image capturing of the selected image capturing device or feeding of a video from the selected image capturing device, wherein the region being monitored comprises a plurality of rooms and a corridor for accessing the rooms, the plurality of image capturing devices includes an image capturing device provided in each of the plurality of rooms and an imaging capturing device disposed in the corridor for capturing videos along the corridor, the program further causes the computer to execute the processes of controlling the selected image capturing device, if the video of the selected image capturing device includes the target being monitored, so as to change an image quality of the video, and controlling the selected image capturing device, if the selected image capturing device is provided in the corridor, so that an image quality of the video captured by the selected image capturing device is higher than an image quality of a video captured by an image capturing device provided in a location other than the corridor.

* * * * *